US011319061B2

(12) United States Patent
Colombo et al.

(10) Patent No.: US 11,319,061 B2
(45) Date of Patent: May 3, 2022

(54) ROTOR FOR A HOVER-CAPABLE AIRCRAFT

(71) Applicant: LEONARDO S.P.A., Rome (IT)

(72) Inventors: Attilio Colombo, Samarate (IT); Luigi Bottasso, Samarate (IT); Paolo Pisani, Samarate (IT); Andrea Favarotto, Samarate (IT); Dario Colombo, Samarate (IT); Federico Montagna, Samarate (IT); Roberto Regonini, Samarate (IT); Francesco Braghin, Samarate (IT); Simone Cinquemani, Samarate (IT)

(73) Assignee: LEONARDO S.P.A., Rome (IT)

( * ) Notice: Subject to any disclaimer, the term of this patent is extended or adjusted under 35 U.S.C. 154(b) by 372 days.

(21) Appl. No.: 16/621,178

(22) PCT Filed: Jun. 28, 2018

(86) PCT No.: PCT/EP2018/067495
§ 371 (c)(1),
(2) Date: Dec. 10, 2019

(87) PCT Pub. No.: WO2019/002513
PCT Pub. Date: Jan. 3, 2019

(65) Prior Publication Data
US 2020/0198779 A1 Jun. 25, 2020

(30) Foreign Application Priority Data

Jun. 30, 2017 (EP) ..................................... 17179162
Jun. 30, 2017 (EP) ..................................... 17207833

(51) Int. Cl.
*B64C 27/04* (2006.01)
*B64C 27/00* (2006.01)
(Continued)

(52) U.S. Cl.
CPC ............ *B64C 27/001* (2013.01); *B64C 27/08* (2013.01); *F16H 1/06* (2013.01); *F16H 1/16* (2013.01);
(Continued)

(58) Field of Classification Search
CPC . B64C 27/001; B64C 27/08; B64C 2027/004; B64C 2027/005; B64C 27/04;
(Continued)

(56) References Cited

U.S. PATENT DOCUMENTS

| 6,062,818 A | 5/2000 | Manfredotti et al. |
| 2006/0197487 A1 | 9/2006 | Manfredotti et al. |

(Continued)

FOREIGN PATENT DOCUMENTS

| EP | 2857313 | 4/2015 |
| GB | 1 120 193 | 7/1968 |
| WO | WO 2015/031768 | 3/2015 |

*Primary Examiner* — Jacob M Amick
(74) *Attorney, Agent, or Firm* — Leason Ellis LLP

(57) ABSTRACT

A rotor for an aircraft is described that comprises: a hub rotatable about an axis and, in turn, comprising a plurality of blades; a mast connectable to a drive member of the aircraft and connected to the hub to drive the hub in rotation about the axis; and damping means to dampen the transmission of vibrations to the mast in a plane orthogonal to the axis; the damping means comprising at least a first mass and a second mass that can eccentrically rotate about the axis with a first and a second speed of rotation, respectively; the first mass and second mass are operatively connected to the mast to generate, respectively, a first and a second damping force on the mast having a main component in a direction radial to the axis; the rotor comprises a transmission unit, which is interposed between the mast and the first and second masses so as to drive the first and second masses in rotation.

15 Claims, 9 Drawing Sheets

(51) Int. Cl.
*B64C 27/08* (2006.01)
*F16H 1/06* (2006.01)
*F16H 1/16* (2006.01)
*F16H 1/28* (2006.01)

(52) U.S. Cl.
CPC .......... *F16H 1/28* (2013.01); *B64C 2027/004* (2013.01); *B64C 2027/005* (2013.01)

(58) Field of Classification Search
CPC ... B64C 27/06; F16H 1/06; F16H 1/16; F16H 1/28
See application file for complete search history.

(56) References Cited

U.S. PATENT DOCUMENTS

| | | | |
|---|---|---|---|
| 2012/0181377 A1* | 7/2012 | Eller | B64C 27/001 244/17.11 |
| 2013/0001841 A1* | 1/2013 | Haynes | F16F 1/387 267/140.2 |
| 2014/0360830 A1* | 12/2014 | Heverly | B64C 27/001 188/378 |
| 2016/0325828 A1 | 11/2016 | Jolly et al. | |

\* cited by examiner

ROTOR FOR A HOVER-CAPABLE AIRCRAFT

PRIORITY CLAIM

This application is a U.S. National Phase Application under 35 U.S.C. § 371 of International Patent Application No. PCT/EP2018/067495, filed Jun. 28, 2018, which claims priority from European Patent Application No. 17179162.7 filed on Jun. 30, 2017 and European Patent Application No. 17207833.9 filed on Jun. 30, 2017, all of which are incorporated by reference as if expressly set forth in their respective entireties herein.

TECHNICAL FIELD

The present invention relates to a rotor for a hover-capable aircraft, in particular to a rotor for a helicopter.

BACKGROUND ART

Helicopters are known to basically comprise a fuselage, a main rotor positioned on the top of the fuselage and rotatable about its own axis, and a tail rotor located at the end of the fuselage.

In greater detail, the rotor, in turn, basically comprises a hub rotatable about the aforementioned axis and equipped with a plurality of blades radially fastened to and projecting from the aforesaid hub, and a mast that can be connected to a drive member and operatively connected to the hub to drive it in rotation.

In use, operation of the rotor causes the creation of high and low frequency vibrations. More specifically, low-frequency vibrations are generated by the wash separating from the blades and from the centre of the hub. This separation takes place at the centre of the hub and affects all the vertical and horizontal aerodynamic surfaces of the tail and the tail rotor.

In use, rotation of the blades at high angular speeds causes the generation of further high-frequency vibrations, which are transmitted to the mast and, in consequence, to the fuselage, deteriorating comfort for the occupants inside the fuselage.

More specifically, the vibratory loads act on both the hub and the mast, both axially and orthogonally to the mast's axis of rotation.

Within the industry, it is known that in the rotating reference system, and thus integral with the rotor, hub and mast, the vibratory loads acting in the plane of the rotor have pulses equal to $(N+1)*\Omega$, $(N-1)*\Omega$ and multiples thereof, where $\Omega$ is the speed of rotation of the mast and N represents the number of blades of the rotor. It is also known that in passing from the rotating system to the fixed system of the fuselage, the vibratory loads acting in the plane of the rotor undergo a frequency shift and have pulses equal to $N*\Omega$ and associated multiples thereof on the fixed system. In other words, the hub and the mast transfer the vibratory aerodynamic load pulses acting in the plane of the blades onto the aforesaid pulses.

From the foregoing, there is a clearly felt need within the industry for limiting transmission from the mast to the fuselage of vibrations with the aforementioned pulses equal to the product of the mast's speed of rotation and the rotor's number of blades.

For this purpose, there are known passive and active damping devices.

Passive damping devices basically comprise masses elastically suspended from the mast or the hub. The vibration of these suspended masses enables at least partially dissipating vibration on the mast and the hub.

Although they are simple to build and install and do not require energy sources outside the rotor, passive damping devices have maximum limits regarding the performance they can offer.

Active damping devices are fundamentally actuators that exert a sinusoidal damping force on the hub or on the mast, which counters the force generated by the vibrations.

An example of these active damping devices is shown in Patent Application EP-A-2857313, in the name of the applicant.

This patent application illustrates the use of a pair of actuators operatively connected to the mast and controlled so as to generate respective damping forces on the mast having components in the plane orthogonal to the mast's axis of rotation.

In greater detail, the actuators are shaped like rings, one on top of the other, are driven in rotation by the mast and rotatably mounted with respect to the mast about the axis of rotation.

The actuators turn in counter rotation about the mast's axis of rotation and generate respective forces on the mast, equal to the product of the mast's speed of rotation and the rotor's number of blades, to counter the aforementioned angular frequency.

Further examples of active damping devices are described in Patent Application US-A-2016/0325828 and in U.S. Pat. No. 8,435,200 B.

Active damping devices have the advantage of being able to modify their damping characteristics according to the development of the vibratory conditions of the hub and the mast.

However, active damping devices are intrinsically more complex than passive damping devices, in terms of weight, power and bulk. Moreover, they need to be powered with a considerable amount of energy.

There is awareness in the industry of the need to dampen flexural vibrations of the mast and the hub, preserving the effectiveness of the aforementioned active damping devices and, at the same time, limiting as far as possible the need for dedicated drive members, so as to reduce weight, bulk and overall costs.

There is also awareness in the industry of the need to make the value of the damping force exerted on the mast as precise and repeatable as possible, so as to make the vibration damping action as precise and repeatable as possible.

In addition, there is awareness of the need to be able to adjust the phase and amplitude of the damping force applied to the mast based on the different vibration conditions of the fuselage.

Finally, there is awareness in the industry of the need to keep the occurrence of undesired vibratory loads in check in the event of failure of one of the drive members.

GB-A-1120193 discloses a rotor for an aircraft according to the preamble of claim 1.

US-A-2014/360830 discloses a rotor for an aircraft, comprising a hub, a mast, damping means with at least one first mass and at least one second mass, and a transmission unit which drives the first and the second mass in rotation in opposite directions.

The aforesaid object is achieved by the present invention, in so far as it relates to a rotor for a hover-capable aircraft as defined in claim 1.

The present invention also relates to a rotor for a hover-capable aircraft as claimed in claim 10.

DISCLOSURE OF INVENTION

The object of the present invention is to produce a rotor for an aircraft capable of hovering that enables satisfying at least one of the above-specified needs in a simple and inexpensive manner.

The aforesaid object is achieved by the present invention, in so far as it relates to a rotor for a hover-capable aircraft as defined in claim 1.

BRIEF DESCRIPTION OF THE DRAWINGS

For a better understanding of the present invention, four preferred embodiments are described hereinafter, purely by way of a non-limitative example and with reference to the accompanying drawings, in which.

BEST MODE FOR CARRYING OUT THE INVENTION

Figure 1:
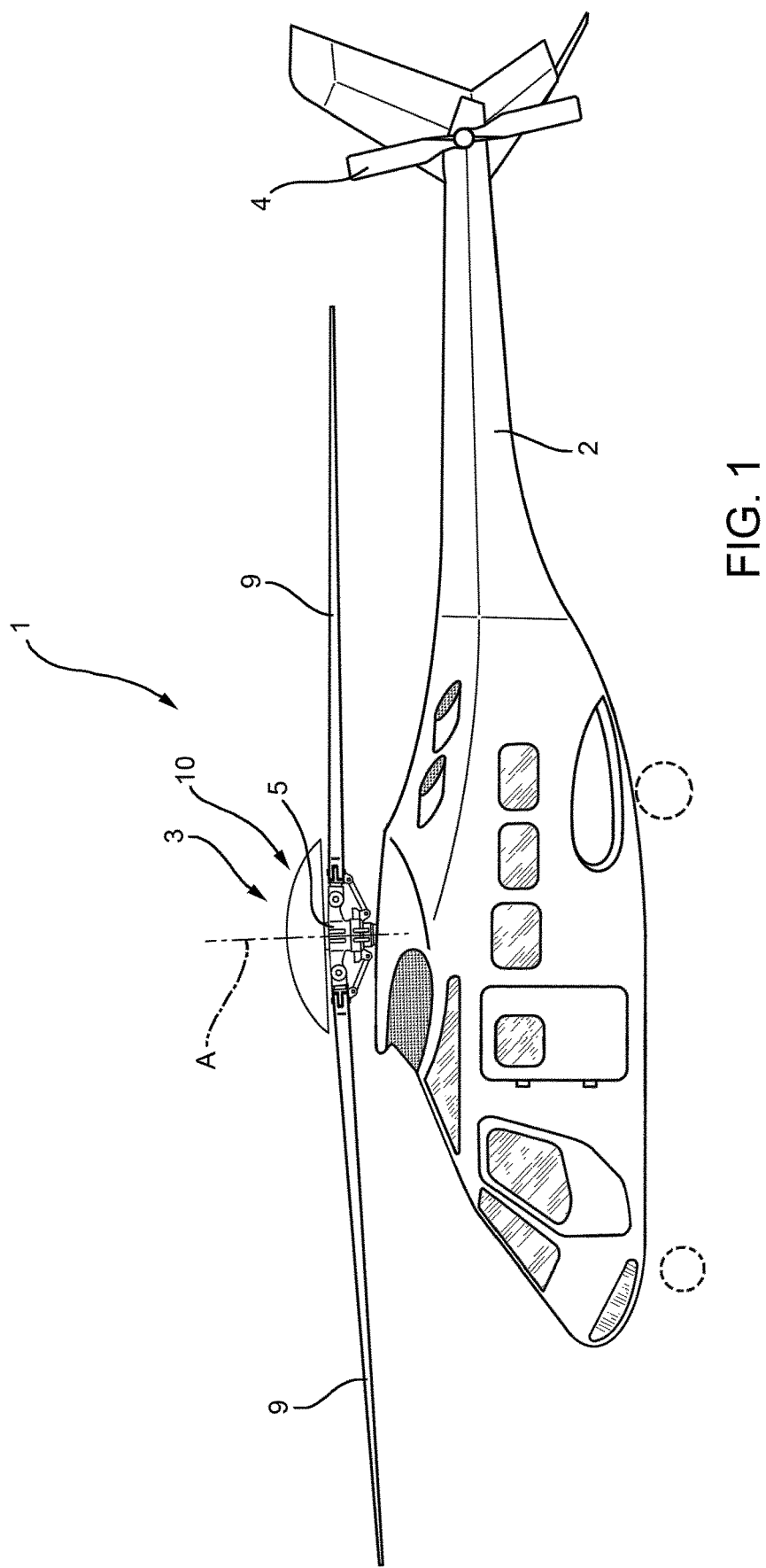
FIG. 1 is a side view of a helicopter comprising a rotor according to a first embodiment of the present invention.

Referring to FIG. 1, reference numeral 1 indicates a hover-capable aircraft, in particular a helicopter basically comprising a fuselage 2, a main rotor 3 positioned on the top of the fuselage 2 and rotating about an axis A, and a tail rotor 4 located at one end of the fuselage 2 and rotating about its own axis, transversal to axis A.

In greater detail, the rotor 3 comprises a hollow hub 5, with an axis A, carrying a plurality of cantilever-mounted blades 9, which extend radially to axis A.

Figure 2:
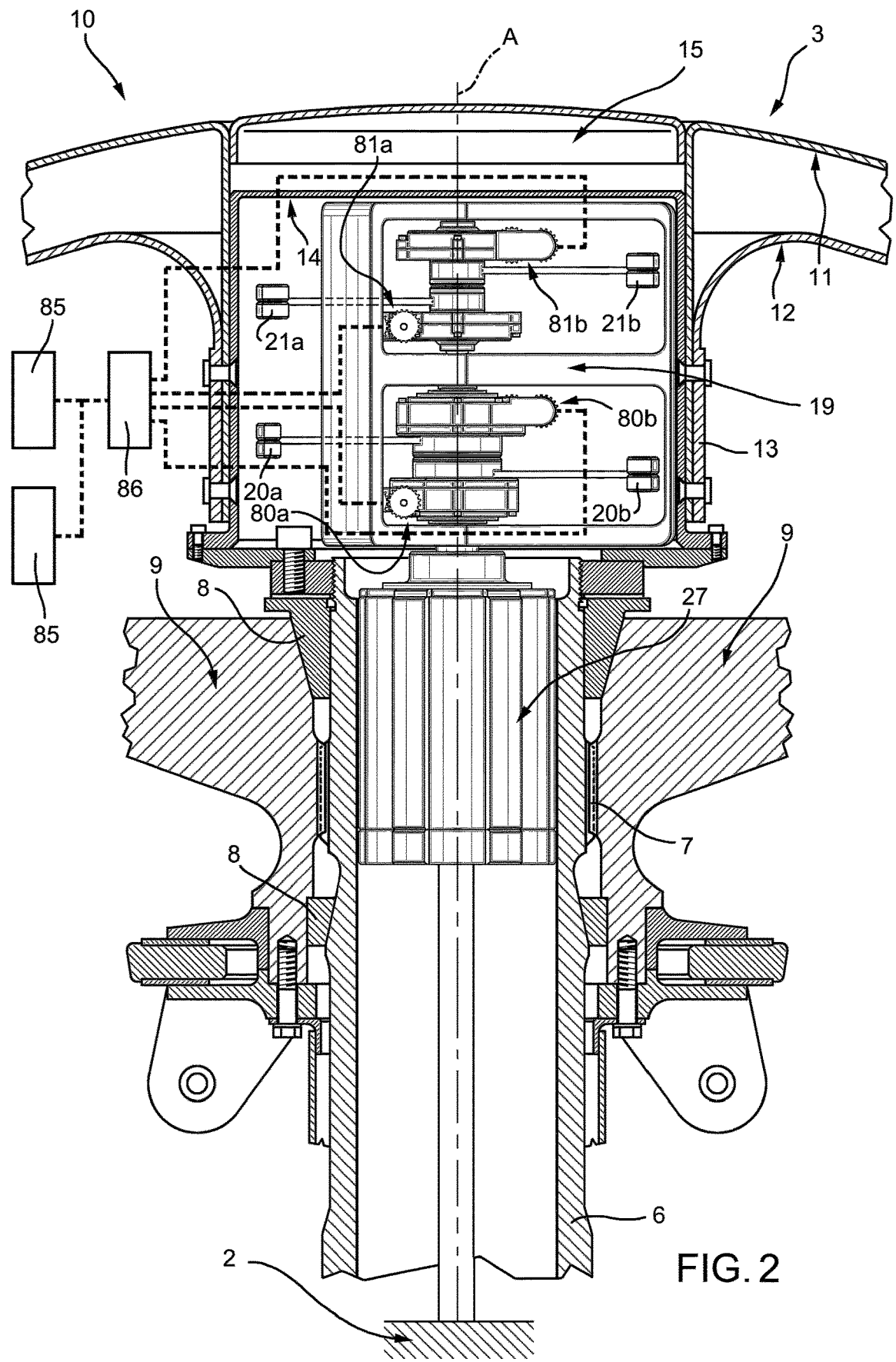
FIG. 2 shows, in section, a damping device incorporated in the rotor in FIG. 1, with parts not fully shown for the sake of clarity.

Referring to FIG. 2, the rotor 3 also comprises a mast 6, rotatable about axis A with angular speed Q with respect to a reference system integral with the fuselage 2, angularly integral with the hub 5, and coupled, in a manner not shown, with a drive member, for example a turbine, carried by the helicopter 1.

More specifically, the mast 6 is partly housed inside the hub 5 and is angularly integral with the hub 5 (FIG. 2).

More specifically, the mast 6 is angularly integral with the hub 5 by means of a splined profile 7 and a pair of wedges 8 radially interposed between the mast 6 and the hub 5. In particular, the splined profile 7 is axially interposed between the aforesaid wedges 8.

In particular, the mast 6 is hollow.

The main rotor 3 also comprises a flow conveyor 10 designed to guide the airflow generated by the rotation of the rotor 3 according to a predetermined path shaped so as to limit the vibrations generated by separation of the aforesaid flow from the tips of the blades 9 located on the opposite end to the hub 5.

In greater detail, the flow conveyor 10 is annular, extends around axis A and is located on the opposite side of the hub 5 with respect to the fuselage 2.

The flow conveyor 10 has a "hat-like" shape and is delimited by a pair of surfaces 11 and 12 axially facing each other; more specifically, surface 11 axially delimits the flow conveyor 10 on the opposite side to the hub 5, while surface 12 axially delimits the flow conveyor 10 on the side closest the hub 5.

Surface 11 is continuous and extends, proceeding in a radial direction starting from axis A, at an axially decreasing distance from the hub 5.

Surface 12 has a first circular peripheral edge 13 and a second peripheral edge (not shown in FIG. 2), opposite to edge 13 and arranged radially outermost to peripheral edge 13. Furthermore, the second peripheral edge of surface 12 axially faces a peripheral edge of surface 11.

Surfaces 11 and 12 are shaped in such a way that that their axial distance decreases when proceeding in a radial direction starting from axis A.

More specifically, surface 12, when proceeding from edge 13 towards the second edge, first moves away from the hub 5 and then moves closer to the hub 5.

Surfaces 11 and 12 are connected to each other by a tubular body 14, symmetrical with respect to axis A and having a lateral surface extending between surfaces 11 and 12.

The rotor 3 further comprises a vibration-damping device 15 for damping the transmission of vibrations to the mast 6 in a plane orthogonal to axis A. In other words, the device 15 dampens the flexural vibrations of the mast 6.

In greater detail, the device 15 comprises a pair of masses 20a, 20b and a pair of masses 21a, 21b, which can eccentrically rotate about axis A with a first and a second angular speed.

The masses 20a, 20b; 21a, 21b are connected to the mast 6.

In this way, masses 20a, 20b generate first damping forces on the mast 6 and masses 21a, 21b generate second damping forces on the mast 6.

The first and second damping forces correspond to the centrifugal forces generated on the mast 6 by the eccentric rotation of the masses 20a, 20b; 21a, 21b on the mast 6.

These first and second damping forces have a sinusoidal course, an amplitude dependent on the magnitude of the respective masses 20a, 20b; 21a, 21b, and on the respective distances of these masses 20a, 20b; 21a, 21b from axis A and the respective rotation speeds about axis A.

The first and second damping forces generate sull'mast 6 respective first and second resultants with a sinusoidal course, the amplitude and phase of which depend on the angular distance of the respective masses 20a, 20b; 21a, 21b relative to axis A. For example, when the angle between the masses 20a, 20b; 21a, 21b is zero, the first (second) resultant has maximum amplitude. Conversely, when this angle is one hundred and eighty degrees, the first (second) resultant has zero amplitude.

Preferably, the masses 20a, 20b are rotatable about axis A with respect to the mast 6 in the same direction of rotation of the mast 6 about axis A and with an angular speed of $(N-1)*\Omega$ relative to the mast 6, where N is the number of blades 6 and $\Omega$ is the angular rotation speed of the mast 6. In this way, the first damping force is sinusoidal with an angular frequency of $N*\Omega$ with respect to the reference system integral with the fuselage.

In the present description, the term angular frequency means the frequency multiplied by 2n.

Masses 21a, 21b rotate about axis A in the opposite direction to the direction of rotation of the mast 6 and with an angular frequency of $(N+1)*\Omega$ relative to the mast 6.

Where not expressly indicated, hereinafter in the present description it is understood that the angular speed $(N-1)*\Omega$ is in the same sense as the angular speed $\Omega$ of the mast 6 and that angular speed $(N+1)*\Omega$ is in the opposite sense to the angular speed $\Omega$ of the mast 6, and that the angular speeds $(N-1)*\Omega$ and $(N+1)*\Omega$ are to be considered in the reference system integral with the mast 6.

In this way, the first and second damping forces both have angular frequency $N*\Omega$ in a reference system integral with the fuselage 2. This angular frequency $N*\Omega$ corresponds to the angular frequency of the vibrations to be dampened, i.e. the vibrations transmitted from the blades 9 to the fuselage 2.

The first damping forces are equal to each other in magnitude and the second damping forces are equal to each other in magnitude.

The masses 20a, 20b; 21a, 21b are equal to each other in pairs.

In the case shown, masses 20a and 20b are equal to masses 21a and 21b.

In a further embodiment that is not shown, the masses 20a, 20b; 21a, 21b could have different values from one another.

Figure 8:
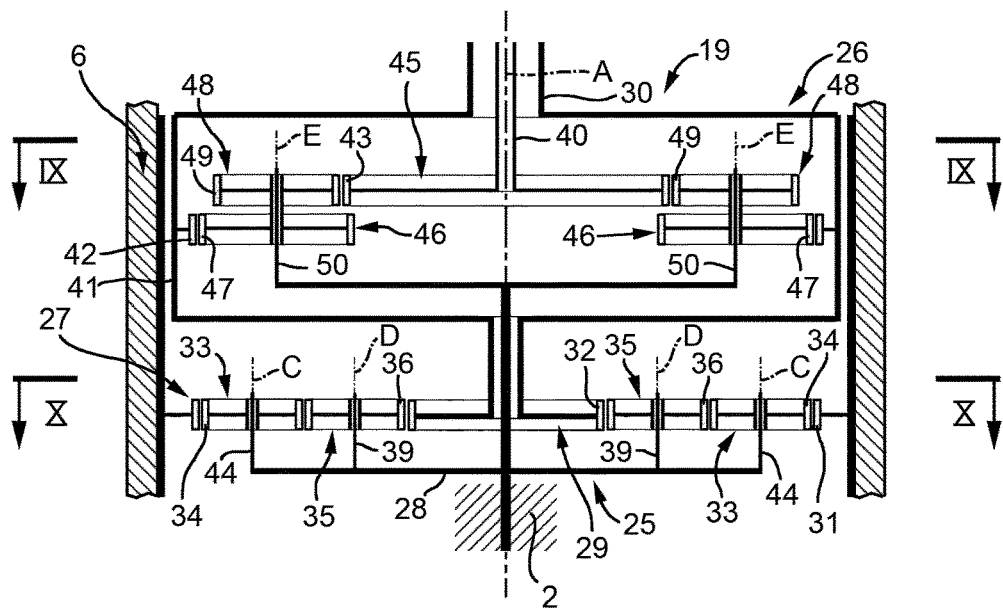
FIG. 8 is an operating diagram of the first components in FIG. 5.

Advantageously, the rotor 3 comprises a transmission unit 19 (FIG. 8) functionally interposed between the mast 6 and the masses 20a, 20b; 21a, 21b so as to drive the aforesaid masses 20a, 20b; 21a, 21b in rotation, respectively with angular speeds $(N-1)*\Omega$; $(N+1)*\Omega$ with respect to the mast 6 and in respective mutually opposite directions of rotation.

In this way, the masses 20a, 20b; 21a, 21b can be driven in rotation with the respective rotation speeds $(N-1)*\Omega$; $(N+1)*\Omega$ without using actuators or energy sources outside the mast 6.

Figure 5:
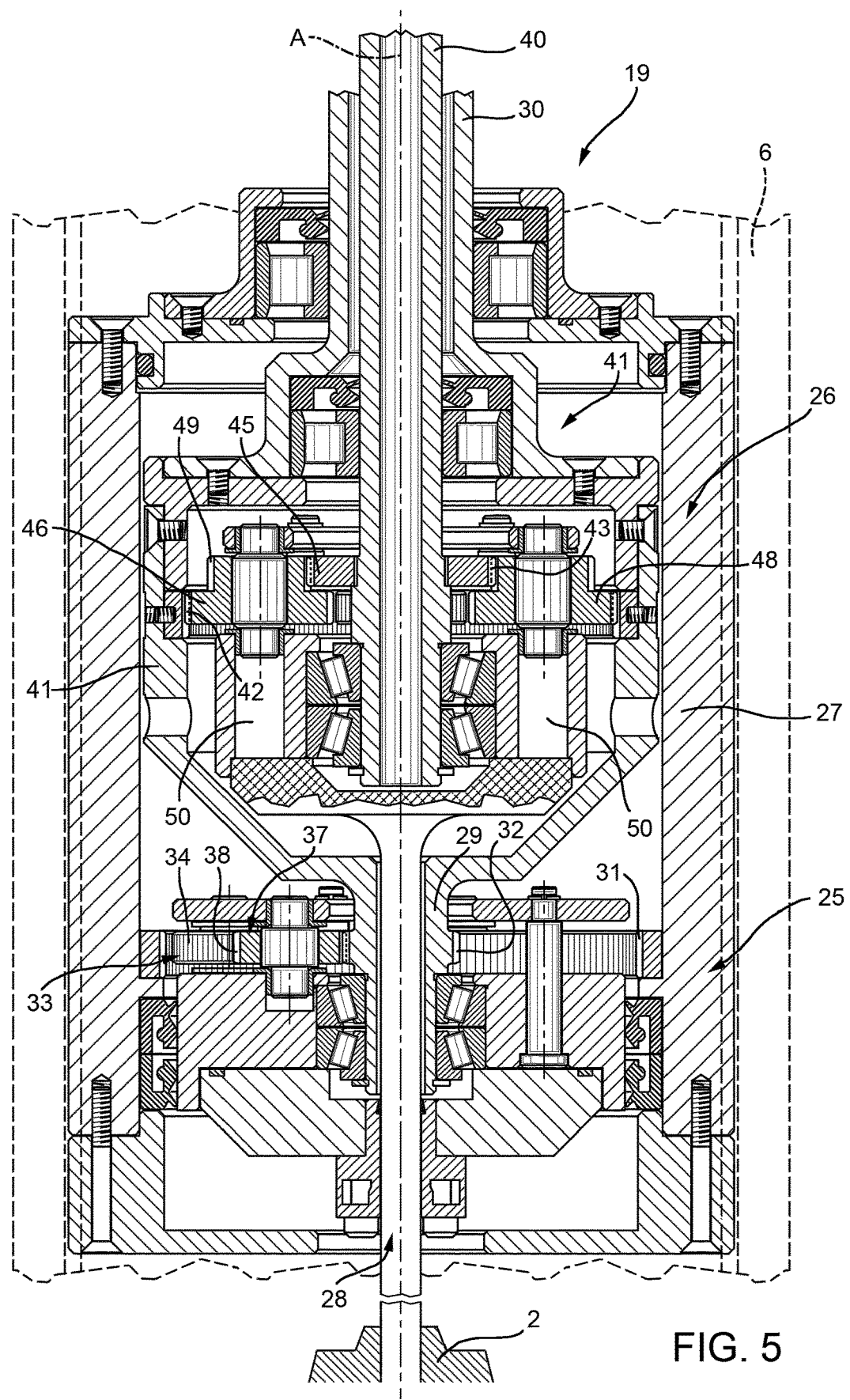
FIG. 5 shows, on a highly enlarged scale and in cross-section, certain details of the damping device in FIG. 2.

Preferably, the transmission unit 19 comprises (FIG. 5):
a stage 25 that receives motion from the rotating mast 6 with angular speed $\Omega$ and has, in output, a shaft 30 angularly integral with masses 20a; 20b and rotating with speed of rotation $(N-1)*\Omega$ in the same direction as the direction of rotation of the mast 6; and
a stage 26 that receives motion from shaft 30 and has, in output, a shaft 40 angularly integral with masses 21a; 21b and rotating with speed of rotation $(N+1)*\Omega$ in the opposite direction to the direction of rotation of the mast 6.

In particular, shafts 30 and 40 rotate about axis A and are housed inside the mast 6. Shaft 40 is coaxial with and housed inside shaft 30.

Shaft 30 rotates in the same direction as the mast 6, while shaft 40 rotates in the opposite direction to the mast 6 and shaft 30.

In the case shown, the masses 20a, 20b, 21a, 21b are arranged inside the body 14 of the flow conveyor 10, as can be seen in FIG. 2.

Stages 25, 26 are respective epicyclic trains.

Figure 10:
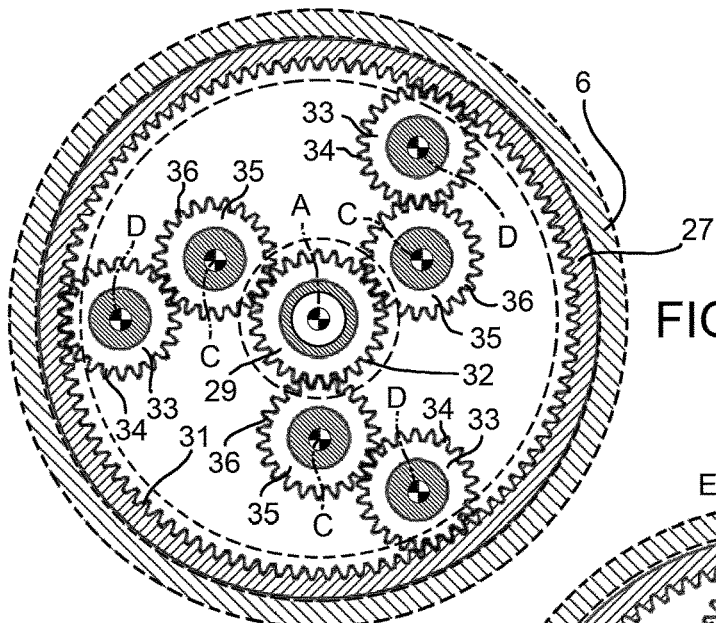
FIG. 10 is a section along the line X-X in FIG. 8.
Figure 9:
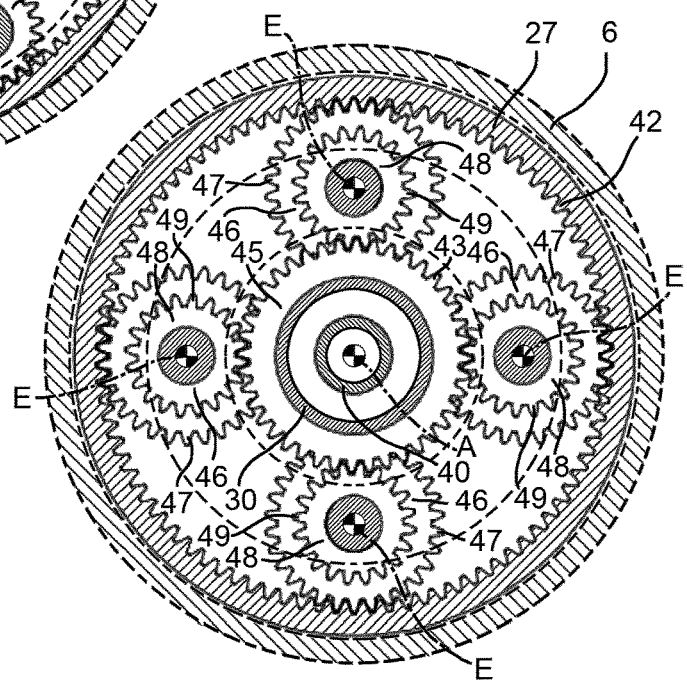
FIG. 9 is a section along the line IX-IX in FIG. 8.

In greater detail, stage 25 comprises (FIG. 8 to 10):
a tubular casing 27 mounted coaxially inside the mast 6 such that it can rotate about axis A at the same angular speed $\Omega$ of the mast 6 and defining gear teeth 31 radially internal with respect to axis A;
a planet-gear carrier 28 fixed to the fuselage 2 and therefore angularly fixed with respect to axis A;
a sun gear 29 rotatable about axis A, defining gear teeth 32 radially external with respect to axis A and angularly integral with shaft 30.

Stage 25 further comprises:
a plurality, three in the case shown, of planet gears 33, rotatable about their own axes C parallel to axis A, and having respective outer gear teeth 34 with respect to the associated axes C and meshing with the gear teeth 31 of the casing 27; and
a plurality, three in the case shown, of planet gears 35, rotatable about their own axes D parallel to the axes A, C, and having respective outer gear teeth 36 with respect to the associated axes C, each meshing with the gear teeth 34 of a respective planet gear 33.

The planet-gear carrier 28 comprises a plurality of arms 44; 39 parallel to respective axes C and D and about which the respective planet gears 33, 35; 37 can rotate.

The mast 6 and shaft 30 turn in the same direction of rotation, thanks to the presence of planet gears 33, 35.

In other words, stage 25 is an epicyclic train, in which:
the casing 27 defines a motion input and forms a ring gear rotating with angular speed $\Omega$ about axis A in the reference system integral with the fuselage 2;
the sun gear 29 rotates with angular speed $(N-1)*\Omega$ about axis A and defines a motion output; and
the planet-gear carrier 28 is angularly fixed with respect to axis A.

Stage 26 comprises, in particular:
a ring gear 41 housed inside the mast 6, axially interposed between the sun gear 29 and shaft 30 and angularly integral with the sun gear 29 and shaft 30, and comprising internal gear teeth 42 with respect to axis A; and
a sun gear 45 rotatable about axis A with angular speed $(N+1)*\Omega$ and angularly integral with shaft 40 and comprising external gear teeth 43 with respect to axis A.

Stage 26 further comprises:
a plurality, three in the case shown, of planet gears 46 rotatable about their own axes E parallel to axis A, and having respective outer gear teeth 47 with respect to the associated axes E and meshing with the gear teeth 42 of the ring gear 41; and
a plurality, three in the case shown, of planet gears 48 angularly integral with the planet gears 46 and having respective outer gear teeth 49 with respect to the associated axes E and meshing with the gear teeth 43 of the sun gear 45.

In particular, the axes E are radially interposed between respective axes C and D.

Furthermore, the diameter of planet gears 46 is greater than the diameter of planet gears 48.

The planet-gear carrier 28 comprises a pair of arms 50 parallel to respective axes E and about which the respective planet gears 46, 48 can rotate.

In other words, stage 26 is an epicyclic train, in which:
the ring gear 41 defines a motion input with angular speed (N−1)*Ω in the same direction as the direction of rotation of the mast 6 and is angularly integral with the sun gear 29 of stage 25;
the sun gear 45 rotates with angular speed (N+1)*Ω in the opposite direction to the direction of rotation of the mast 6 and defines a motion output; and
the planet-gear carrier 28 is fixed and is shared with stage 25.

The rotor 3 also comprises (FIGS. 3, 4, 6 and 7):
connection groups 60a, 60b for connecting the shaft 30 and the respective masses 20a, 20b angularly together about axis A; and
connection groups 61a, 61b for connecting the shaft 40 and the respective masses 21a, 21b angularly about axis A.

Figure 6:
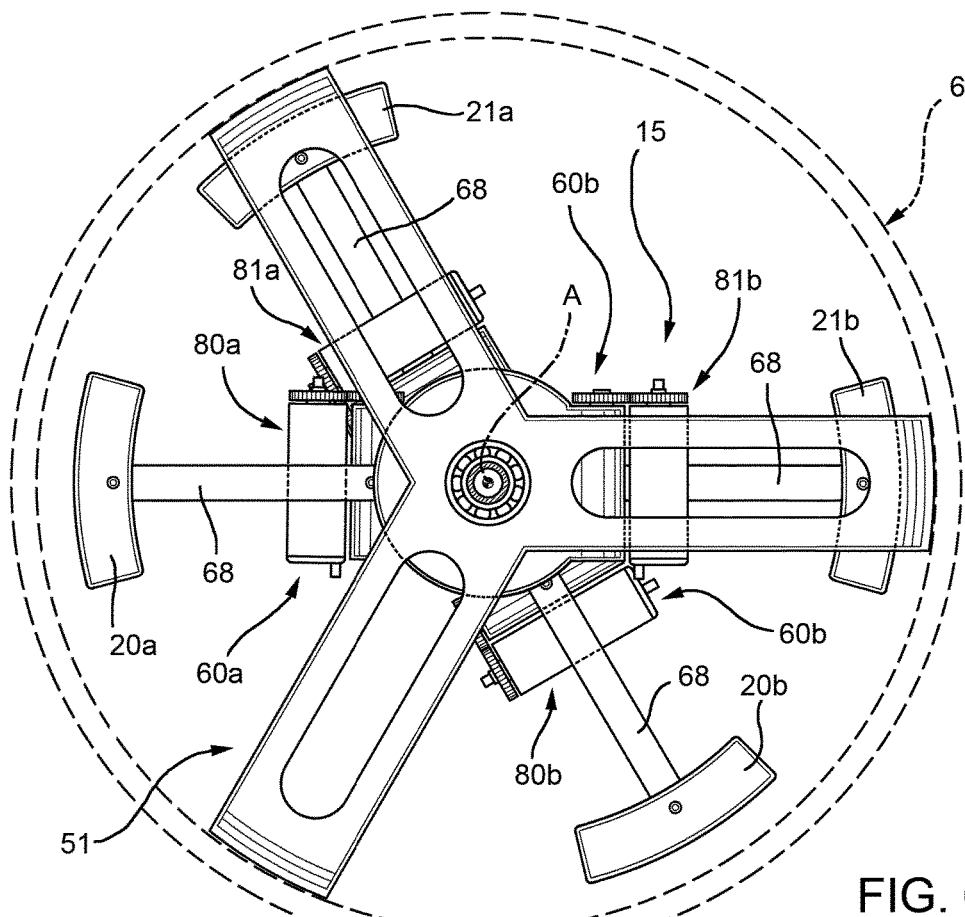
FIG. 6 is a top view of the first components in FIG. 3.
Figure 7:
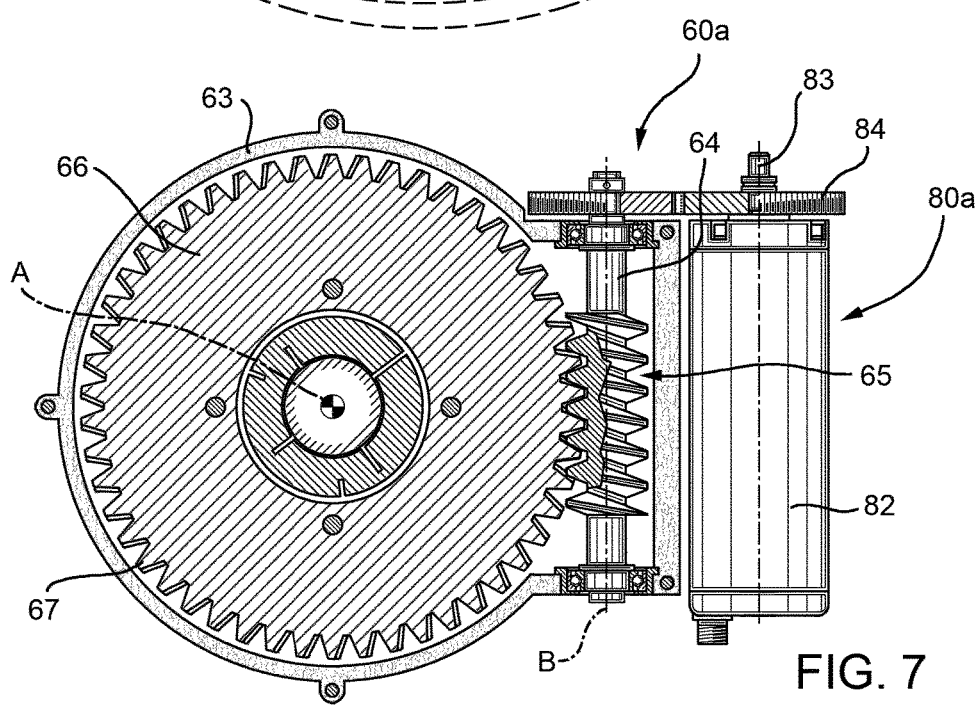
FIG. 7 is a top view of the second components in FIG. 4.

With particular reference to FIG. 6, the connection groups 60a, 60b; 60c, 60d are housed inside a casing 51 angularly integral with the mast 6 and housed inside the mast 6.

In the following, only one connection group 60a, 60b, 61b, 61b will be described as these connection groups 60a, 60b, 61a, 61b are identical.

The connection group 60a, 60b (61a, 61b) basically comprises (FIGS. 4, 6 and 7):
a sleeve 62 fitted on shaft 30 coaxial with axis A; and
a casing 63 surrounding the sleeve 62, driven in rotation by the sleeve 62 and angularly connected to the masses 20a, 20b (21a, 21b) in a manner that will be described in detail further in this description.

In greater detail, the casing 63 extends around axis A and houses:
a shaft 64 rotatable about an axis B orthogonal to and offset from axis A with respect to the casing 63 and angularly integral with the casing 63 about axis A;
a worm screw 65 rotating integrally with the shaft 64 about axis B; and
a disc 66 mounted in manner angularly movable about axis A with respect to the sleeve 62 and the shaft 30 (40), equipped with helical gear teeth 67, external with respect to axis A and meshing with the worm screw 65, and angularly integral with the mass 20a, 20b (21a, 21b).

The casing 63 also performs the function of containing the oil necessary for lubricating the movement of the shaft 64 and the disc 66, and protecting the worm screw 65.

Figure 3:
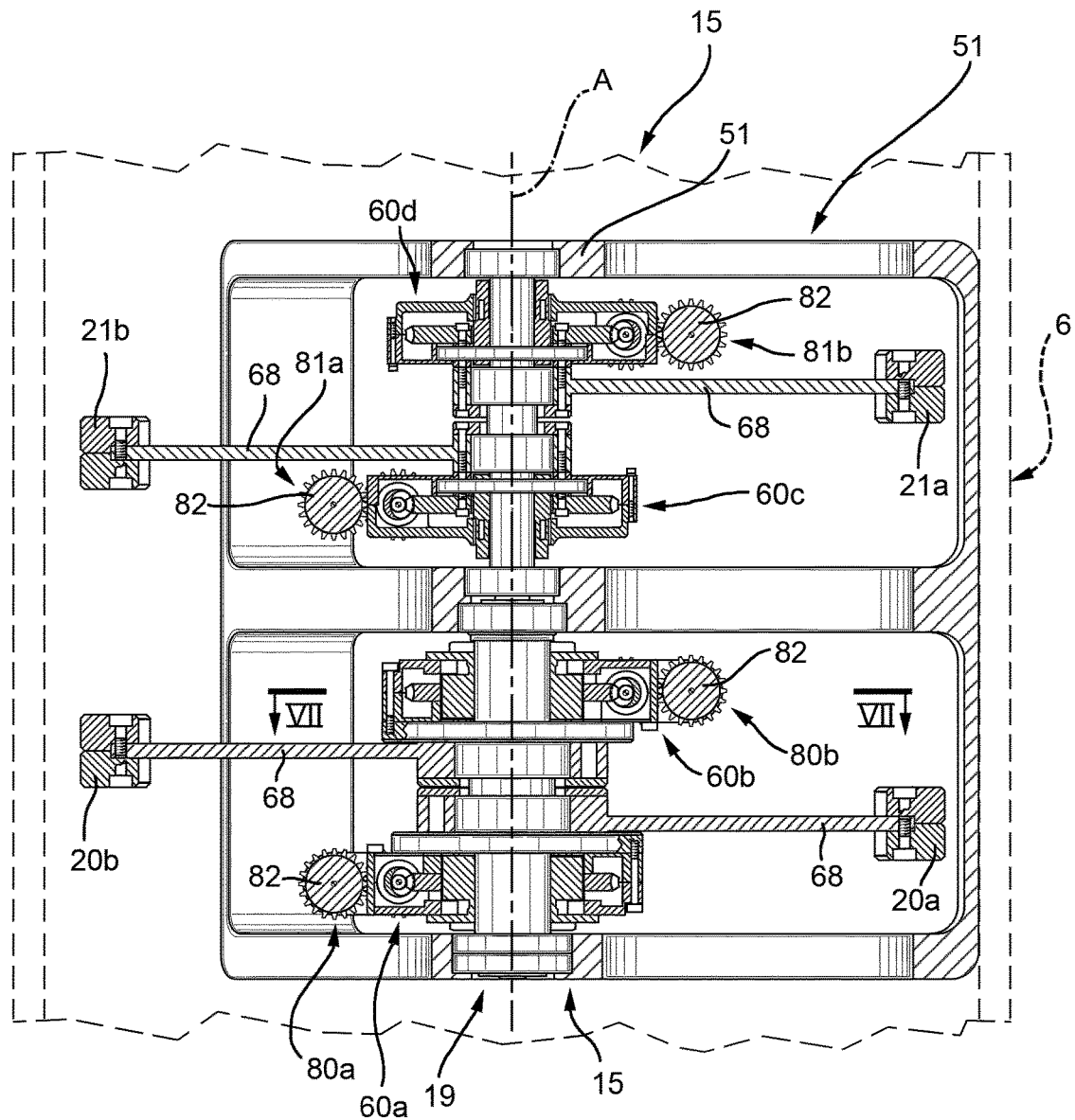
FIG. 3 shows, on an enlarged scale, first components of the rotor in FIG. 2.
Figure 4:
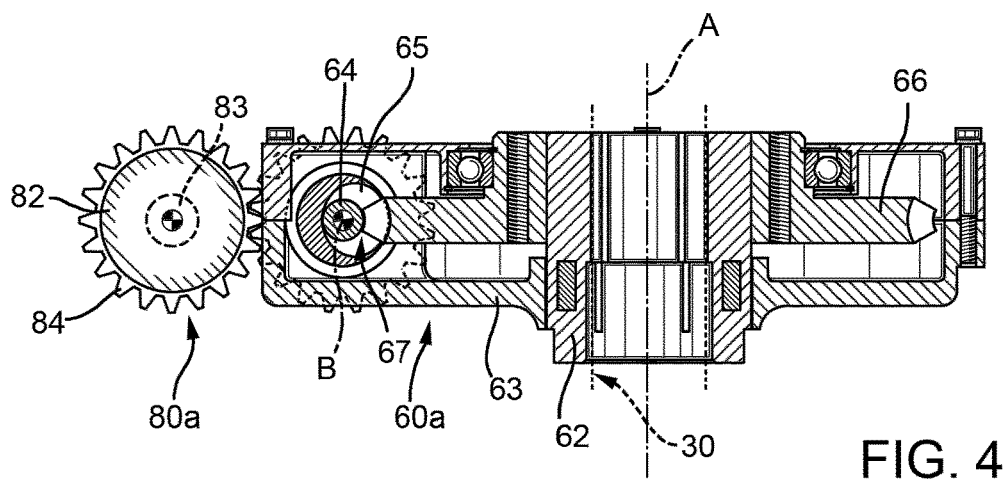
FIG. 4 shows, on a still further enlarged scale, second components of the damping device in FIG. 3.

The disc 66 is also connected in an angularly integral manner with an associated arm 68 (FIGS. 3 and 6). The arm 68 extends radially from only one side of axis A and carries, overhanging at its opposite end to the axis, the associated mass 20a, 20b (21a, 21b).

The worm screw 65 and gear teeth 67 of the disc 66 are configured so as to create a condition of irreversible motion.

In particular, rotation of the worm screw 65 about axis B causes rotation of the disc 66 and, therefore, of the mass 20a, 20b (21a, 21b) about axis A by a predetermined angle. Conversely, rotation of the disc 66 about axis A does not cause rotation of the worm screw 65 about axis B.

From the foregoing, it follows that the rotation of shaft 30 about axis A drives the worm screw 65, the disc 66 and the masses 20a, 20b (21a, 21b) in rotation with the same angular speed (N−1)*Ω ((N+1)*Ω) about axis A.

It is important to note that the condition of irreversible motion existing between the worm screw 65 and the gear teeth 67 prevents inertia of the disc 66 from causing relative movement between the worm screw 65 and the gear teeth 67 when the worm screw 65 is angularly stationary with respect to axis B. In other words, when the worm screw 65 is angularly stationary with respect to axis B, the worm screw 65 and the disc 66 behave like bodies rigidly connected to each other and rotate integrally about axis A.

Advantageously, the rotor 3 further comprises a plurality of actuators 80a, 80b; 81a, 81b (FIGS. 3, 4, 6 and 7) selectively operable to vary the phase and amplitude of the first and second resultant forces generated by the rotation of the mass 20a, 20b; 21a, 21b on the mast 6.

In greater detail, the actuators 80a, 80b are selectively operable to vary the angle between the masses 20a, 20b about axis A so as to change the phase and amplitude of the first resultant force.

The actuators 81a, 81b are selectively operable to vary the angle between the masses 21a, 21b about axis A so as to change the phase and amplitude of the second resultant force.

With particular reference to FIGS. 3 to 7, each actuator 80a, 80b; 81a, 81b comprises:
an electric motor 82 having an output shaft 83 rotatable about an axis parallel to and offset from axis B; and
a gear 84 interposed between the electric motor 82 and the associated shaft 64, and designed to transform rotation of the output shaft 83 parallel to axis B into rotation of shaft 64 and the worm screw 65 about axis B.

The electric motor 82 is housed externally to the associated casing 63.

The electric motor 82 is angularly integral with the associated casing 63 and, therefore, with shaft 30 (40) about axis A.

In consequence, both when switched on and when switched off, the electric motor 82, rotates about axis A with angular speed (N−1)*Ω, ((N+1)*Ω) integral with the shaft 30 (40) and with the casing 63.

Conversely, switching on the electric motor 82 causes rotation of shafts 83, 64 parallel to axis B and the worm screw 65 about axis B with respect to the casing 63 and shaft 30 (40).

The rotation of the worm screw 65 about axis B causes rotation of the disc 66 and the arm 68 of the associated mass 20a, 20b (21a, 21b) about axis A.

In other words, each actuator 80a, 80b; 81a, 81b, through the selective powering on of the relevant electric motor 82, causes an additional rotation of the associated mass 20a, 20b; 21a, 21b about axis A by a predetermined angle with respect to the associated shaft 30; 40. This rotation adds to the continual rotation of the masses 20a, 20b; 21a, 21b with respective angular speeds (N−1)*Ω; (N+1)*Ω about axis A.

The rotor 3 further comprises:
a first slip-ring (not shown) to electrically connect a source of electrical power carried on the fuselage 2 with the electric motors 82 of actuators 80a, 80b; and
a second slip-ring (also not shown) to electrically connect the electricity source with the electric motors 82 of actuators 81a, 81b.

Finally, the rotor 3 comprises:
a plurality of sensors 85 (schematically shown in FIG. 2) capable of generating a plurality of signals associated with the state of acceleration of the fuselage 2 in a plane orthogonal to axis A; and
a control unit 86 (also schematically shown in FIG. 2) configured to generate, on the basis of one of the signals generated by the sensors 85, a control signal for the actuators 80a, 80b, 81a, 81b.

In use, the mast 6 drives the hub 5 and the blades 9 in rotation about axis A.

More specifically, the mast 6 rotates about axis A with angular speed Ω, with reference to the reference system integral with the fuselage 2.

The rotation of the hub 5 and the blades 9 generates vibrations, which would be transmitted to the mast 6 and, from there, to the fuselage 2 of the helicopter 1.

With respect to the fixed system of the fuselage, these vibrations mainly have an angular frequency equal to N*Ω, where N is the number of blades 9 and Ω is the angular rotation speed of the mast 6.

In order to reduce these vibrations, the mast 6 drives, via the transmission unit 19, the masses 20*a*, 20*b*; 21*a*, 21*b* in eccentric rotation about axis A with respective angular speeds (N−1)*Ω; (N+1)*Ω and in respective directions, in the same and in the opposite direction with respect to the direction of rotation of the mast 6.

Due to the centrifugal effect, these eccentric rotations of the masses 20*a*, 20*b*; 21*a*, 21*b* generate respective first and second damping forces acting on the mast 6.

More specifically, the first and the second damping forces are sinusoidal and with respective angular frequencies equal to (N−1)*Ω and (N+1)*Ω, in the reference system integral with the mast 6.

These first and second damping forces counter the loads due to these vibrations in a plane orthogonal to axis A.

Furthermore, these first and second damping forces have, in the reference system integral with the fuselage 2, an angular frequency equal to N*Ω, i.e. the angular frequency of the disturbing vibratory forces that it is wished to dampen.

The first and second damping forces generate respective first and second resultants on the mast 6.

These first and second resultants have amplitude and phase dependent on the respective angle between the masses 20*a*, 20*b*; 21*a*, 21*b*. For example, the amplitude of these first and second resultants will be maximum when the angle between the associated masses 20*a*, 20*b*; 21*a*, 21*b* is zero degrees and minimum when the angle between the associated masses 20*a*, 20*b*; 21*a*, 21*b* is one hundred and eighty degrees.

It is important to note that the masses 20*a*, 20*b*; 21*a*, 21*b* exert the respective first and second resultants on the mast 6 and rotate with respective angular speeds (N−1)*Ω; (N+1)*Ω, both when the actuators 80*a*, 80*b*; 81*a*, 81*b* are activated and when they are deactivated.

Whereas the selective activation of the actuators 80*a*, 80*b*; 81*a*, 81*b* enables varying the amplitude and phase of the first and second resultant forces on the mast 6.

The functioning of the rotor 3 is hereinafter described starting from a state in which the actuators 80*a*, 80*b*; 81*a*, 81*b* are deactivated.

The mast 6 drives shaft 30, via stage 25 of the transmission unit 19, and shaft 40, via stage 26 of the transmission unit 19, in rotation about axis A.

The stages 25 and 26 are sized such that the shafts 30 and 40 rotate with respective angular speeds (N−1)*Ω and (N−1)*Ω about axis A in the reference system integral with the mast 6.

In particular, the mast 6 and shaft 30 rotate in the same direction and shaft 40 rotates in the opposite direction to the mast 6 and shaft 30.

The shafts 30; 40 drive the masses 20*a*, 20*b*; 21*a*, 21*b* in rotation about axis A with respective angular speeds (N−1)*Ω; (N−1)*Ω by means of the associated connection groups 60*a*, 60*b*; 61*a*, 61*b*.

In greater detail, shaft 30 (40) drives in rotation, integrally with itself, and about axis A, the assembly formed by the sleeve 62, the casing 63, the shaft 64, the worm screw 65, the disc 66 and the actuator 80*a*, 80*b* (81*a*, 81*b*) associated with the respective connection groups 60*a*, 60*b* (61*a*, 61*b*).

In the state where the actuators 80*a*, 80*b*; 81*a*, 81*b* are deactivated, the electric motors 82 are not powered and, therefore, the worm screw 65 is angularly stationary with respect to axis B.

In this situation, the worm screw 65 and the disc 66 of the associated connection groups 60*a*, 60*b* (61*a*, 61*b*) behave like rigidly connected bodies. This happens because the condition of irreversible motion existing between the worm screw 65 and the gear teeth 67 of the disc 66 prevents inertia of the disc 66 causing relative movement between the worm screw 65 and the gear teeth 67.

In consequence, in the aforementioned condition, the discs 66 of the connection groups 60*a*, 60*b* (61*a*, 61*b*), although mounted in an angularly movable manner with respect to shaft 30 (40) about axis A, are driven in rotation by shaft 30 (40) with the respective angular speeds (N−1)*Ω, ((N+1)*Ω).

The rotation of the discs 66, via the arms 68, causes the eccentric rotation of the associated masses 20*a*, 20*b*; 21*a*, 21*b* about axis A with the respective angular speeds (N−1)*Ω; (N+1)*Ω.

The functioning of the rotor 3 is hereinafter described with reference to a state of activation of the actuators 80*a*, 80*b*, 81*a*, 81*b*.

The control unit 86 receives signals from the sensors 85 associated with the state of acceleration of the mast 6 and generates control signals for the electric motors 82 of the actuators 80*a*, 80*b*; 81*a*, 81*b*, in the event of detecting the need to vary the phases and amplitudes of the first and second resultants.

The activation of one or more electric motors 82 of the actuators 80*a*, 80*b*; 81*a*, 81*b* causes rotation of the respective output shafts 83 about the respective axes B for predetermined angles.

One or more output shafts 83 drive the associated shafts 64 and worm screws 65 in rotation, by means of gears 84, about the respective axes B for predetermined angles.

The rotation of one or more worm screws 65 causes the rotation of one or more discs 66 and, therefore, of one or more masses 20*a*, 20*b*; 21*a*, 21*b* with respect to the mast 6 and about axis A, by a predetermined angle.

Figure 11:
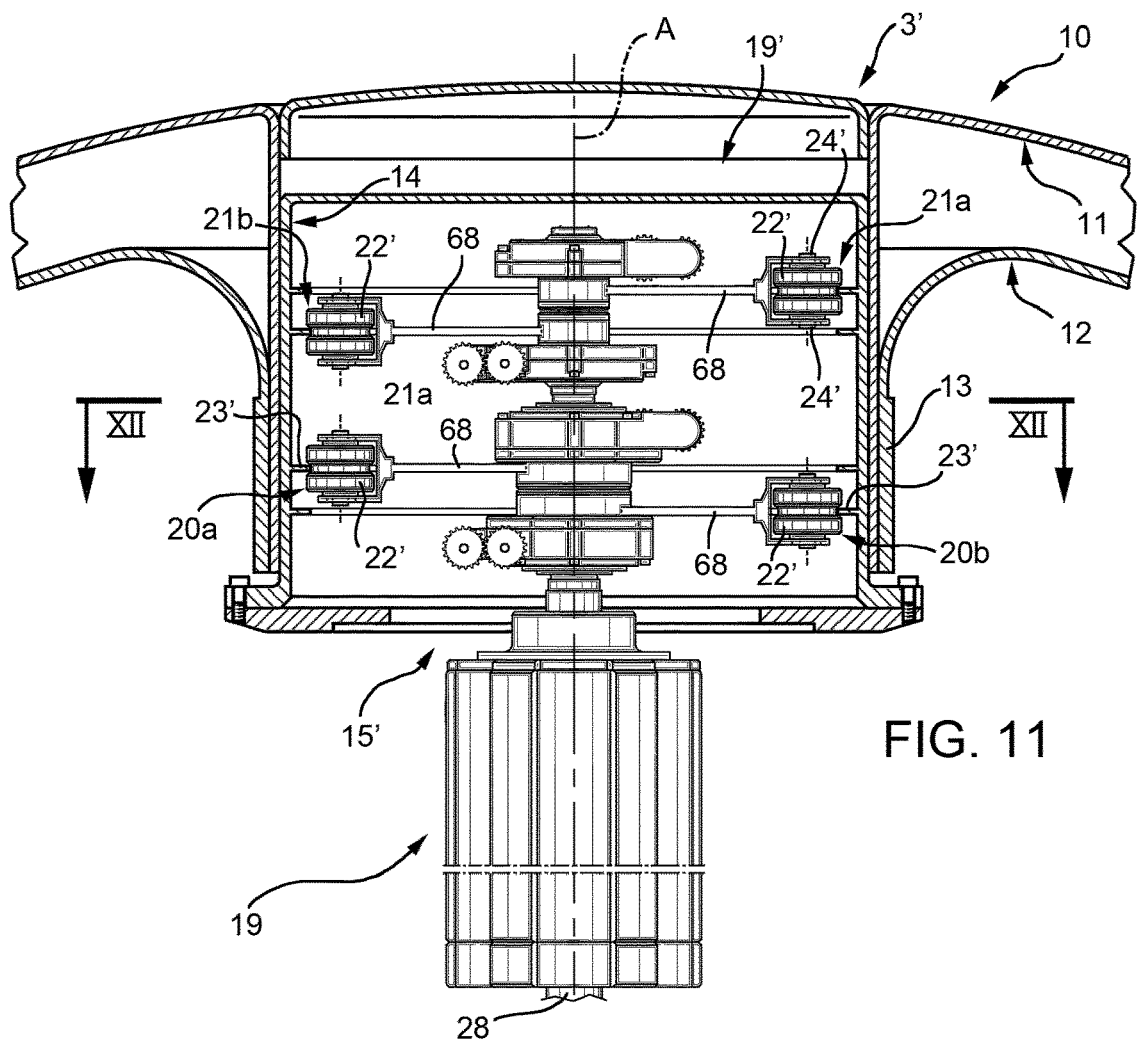
FIG. 11 shows, in cross-section, a rotor according to a further embodiment of the present invention, with parts not fully shown for the sake of clarity.
Figure 12:
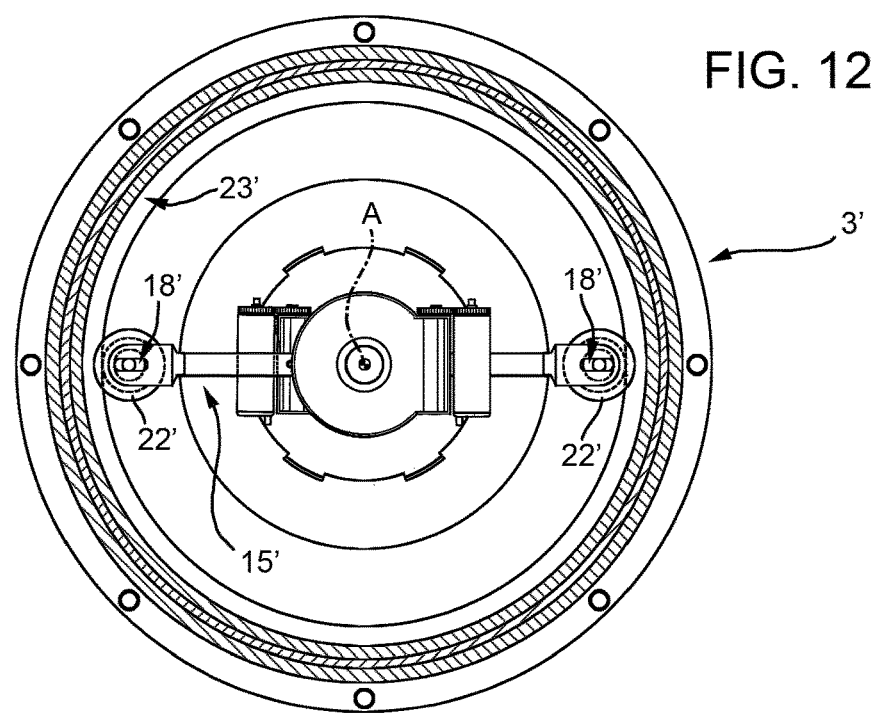
FIG. 12 is a section along the line XII-XII in FIG. 11.

Referring to FIGS. 11 and 12, reference numeral 3' indicates a rotor according to a second embodiment of the present invention.

Rotor 3' is similar to rotor 3 and will hereinafter be described only with regard to what differentiates it from the latter; the same or equivalent parts of the rotors 3, 3' will be indicated, where possible, by the same reference numbers.

In particular, rotor 3' differs from rotor 3 in that the masses 20*a*, 20*b*; 21*a*, 21*b*, the actuators 80*a*, 80*b*; 81*a*, 81*b* and the connection groups 60*a*, 60*b*; 61*a*, 61*b* are housed inside the body 14 of the flow conveyor 10.

Furthermore, rotor 3' differs from rotor 3 in that the masses 20*a*, 20*b*; 21*a*, 21*b* are shaped like respective rollers 22' rotating about respective axes parallel to axis A, mounted in a movable manner with respect to the associated arms 68, radially to axis A, and rolling on respective guides 23' provided in the body 14 of the flow conveyor 10.

More specifically, the rollers 22' extend around respective axes parallel to axis A and have respective axial ends 24' opposite to each other and radially sliding in corresponding radial slots 18' defined by the free ends of the arms 68.

The functioning of rotor 3' is entirely similar to that of rotor 3 and is only described with regard to what differs from the functioning of rotor 3.

In particular, the rollers 22' defining the masses 20a, 20b; 21a, 21b are pushed by centrifugal force against the guides 23' provided in the body 14.

Due to the fact that the rollers 22' can slide, with respect to the associated arms 68, radially to axis A, the centrifugal forces acting on the rollers 22' are discharged on the body 14 of the flow conveyor 10.

Figure 13:
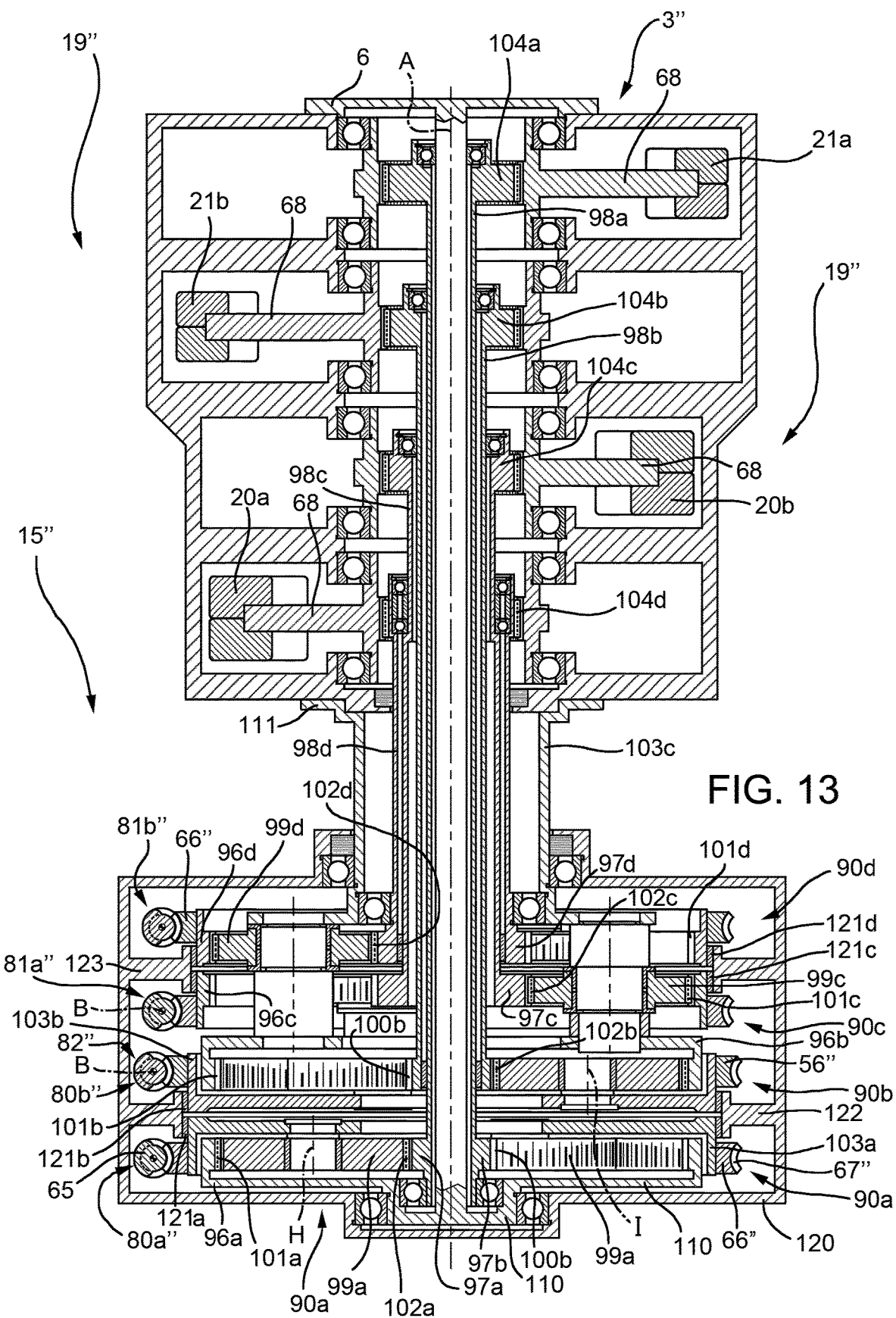
FIG. 13 shows, in cross-section, a rotor according to a third embodiment of the present invention, with parts removed for clarity.

Referring to FIG. 13, reference numeral 3" indicates a rotor according to a third embodiment of the present invention.

Rotor 3" is similar to rotor 3 and will hereinafter be described only with regard to what differentiates it from the latter; the same or equivalent parts of the rotors 3, 3" will be indicated, where possible, by the same reference numbers.

Rotor 3" differs from rotor 3 in that the transmission unit 19" comprises a plurality of stages 90a, 90b; 91a, 91b, which receive motion from the mast 6 rotating with angular speed Ω and drive the arm 68 of the associated masses 20a, 20b; 21a, 21b in rotation with the corresponding angular speeds (N−1)*Ω; (N+1)*Ω in the reference system integral with the mast 6.

In greater detail, each stage 90a, 90b; comprises:
- a ring gear 96a, 96b defining a motion input and rotating integrally with the mast 6 about axis A;
- a sun gear 97a, 97b connected to a shaft 98a, 98b, and rotatable about axis A;
- a plurality, three in the case shown, of planet gears 99a, 99b rotatable about their own axes H, parallel to and offset from axis A, and having respective gear teeth 100a, 100b meshing, on respective opposite sides of the associated axis H, with gear teeth 101a, 101b of the ring gear 96a, 96b, and with gear teeth 102a, 102b of the sun gear 97a, 97b; and
- a planet-gear carrier 103a, 103b with respect to which the respective planet gears 99a, 99b rotate about their respective axes H.

Each stage 90c, 90d comprises:
- a ring gear 96c, 96d;
- a sun gear 97c, 97d connected to a shaft 98c, 98d, and rotatable about axis A;
- a plurality, three in the case shown, of planet gears 99c, 99d rotatable about their own axes I, parallel to and offset from axis A, and having respective gear teeth 100c, 100d meshing, on respective opposite sides of the associated axis I, with gear teeth 101c, 101d of the ring gear 96c, 96d, and with gear teeth 102c, 102d of the sun gear 97c, 97d; and
- a planet-gear carrier 103c, common to the stages 90c, 90d, defining a motion input and rotating integrally with the mast 6 about axis A, and fixed to the ring gear 96b of stage 90b.

The planet gears 99c, 99d are rotatable about their own axes I with respect to the common planet-gear carrier 103c.

Each stage 90a, 90b, 90c, 90d also comprises a broach-like element 104a, 104b, 104c, 104d, which connects a portion of the respective shaft 98a, 98b, 98c, 98d arranged on the axially opposite side with respect to the associated sun gear 97a, 97b, 97c, 97d and radially external with respect to axis A with a portion of the arm 68 of the associated mass 21a, 21b; 20a, 20b arranged radially internal with respect to axis A.

In the case shown, the ring gear 96a is connected to a flange 110 extending radially outwards from the mast 6.

The ring gear 96b and the planet-gear carriers 103c are connected to a hollow body 111, which is connected to the mast 6 at the end axially opposite to the flange 110.

In the case shown, the shafts 98a, 98b, 98c, 98d are arranged in this sequence when proceeding radially on the opposite side of axis A.

Shaft 98a surrounds the mast 6.

Body 111 surrounds the shafts 98a, 98b, 98c, 98d, and the mast 6.

Furthermore, the shafts 98a, 98b, 98c, 98d have, in this sequence, decreasing lengths measured parallel to axis A.

Axes H are radially interposed between axis A and axes I.

The transmission unit 19" further comprises a casing 120 housing the stages 90a, 90b, 90c, 90d and connected to the fuselage 2 in a way not shown in detail.

The planet-gear carriers 103a, 103b and the ring gears 96c, 96d are connected to the casing 120 by respective annular bushings 121a, 121b, 121c, 121d coaxial with respect to axis A.

In the case shown, the bushings 121a, 121b; 121c, 121d are radially interposed between the arms 122; 123 projecting in a cantilever fashion from the casing 120 towards axis A and the respective planet-gear carriers 103a, 103b and the ring gears 96c, 96d.

Rotor 3" also differs from rotor 3 in that the actuators 80a", 80b", 81a", 81b" are carried by planet-gear carriers 103a, 103b and by ring gears 96c, 96d, respectively.

Each actuator 80a", 80b", 81a", 81b" further comprises:
- an electric motor 82" having an output member 83 rotatable about axis B and on which the worm screw 65 is mounted; and
- a disc 66" having helical gear teeth 67" meshing with the worm screw 65 and fixed to the associated planet-gear carrier 103a, 103b and ring gear 96c, 96d.

The functioning of rotor 3" is entirely similar to that of rotor 3 and is only described with regard to what differs from the functioning of rotor 3.

In particular, the mast 6 drives the shafts 98a, 98b in rotation and, therefore, the masses 21a, 21b via the respective stages 90a, 90b. The mast 6 also drives shafts 98c, 98d in rotation and, therefore, the masses 20a, 20b via the respective stages 90c, 90d.

In greater detail, the stages 90c, 90d are sized in such a way that the masses 20a, 20b rotate about axis A with angular speeds (N−1)*Ω and the same direction as the direction of rotation of the mast 6. The stages 90c, 90d are sized in such a way that the masses 21a, 21b rotate about axis A with angular speeds (N+1)*Ω and in the opposite direction to the direction of rotation of the mast 6.

In the state where the actuators 80a", 80b", 81a", 81b" are deactivated, the planet-gear carriers 103a, 103b and the ring gears 96c, 96d remain angularly integral with the casing 120 and, therefore, angularly fixed with respect to axis A.

In these conditions, the angle between the masses 20a, 20b; 21a, 21b remains constant.

If the control unit 86 detects the need to vary the phases or amplitudes of the first and second resultants, one or more actuators 80a", 80b", 81a", 81b" are activated, causing the rotation, by a predetermined angle, of the associated one or more worm screws 65 about axis B and of the associated one or more discs 66" about axis A, fixed to an associated planet-gear carrier 103a, 103b or ring gear 96c, 96d. This rotation is transmitted to the associated one or more sun gears 97a, 97b, 97c, 97d and, in turn, to the associated one or more masses 20a, 20b, 21a, 21b.

Rotation of the planet-gear carrier 103, 103b and/or ring gear 96c, 96d about axis A is enabled by the bushings 121a, 121b, 121c, 121d radially interposed between the casing 120 and the planet-gear carriers 103, 103b and/or the ring gear 96c, 96d.

Figure 14:
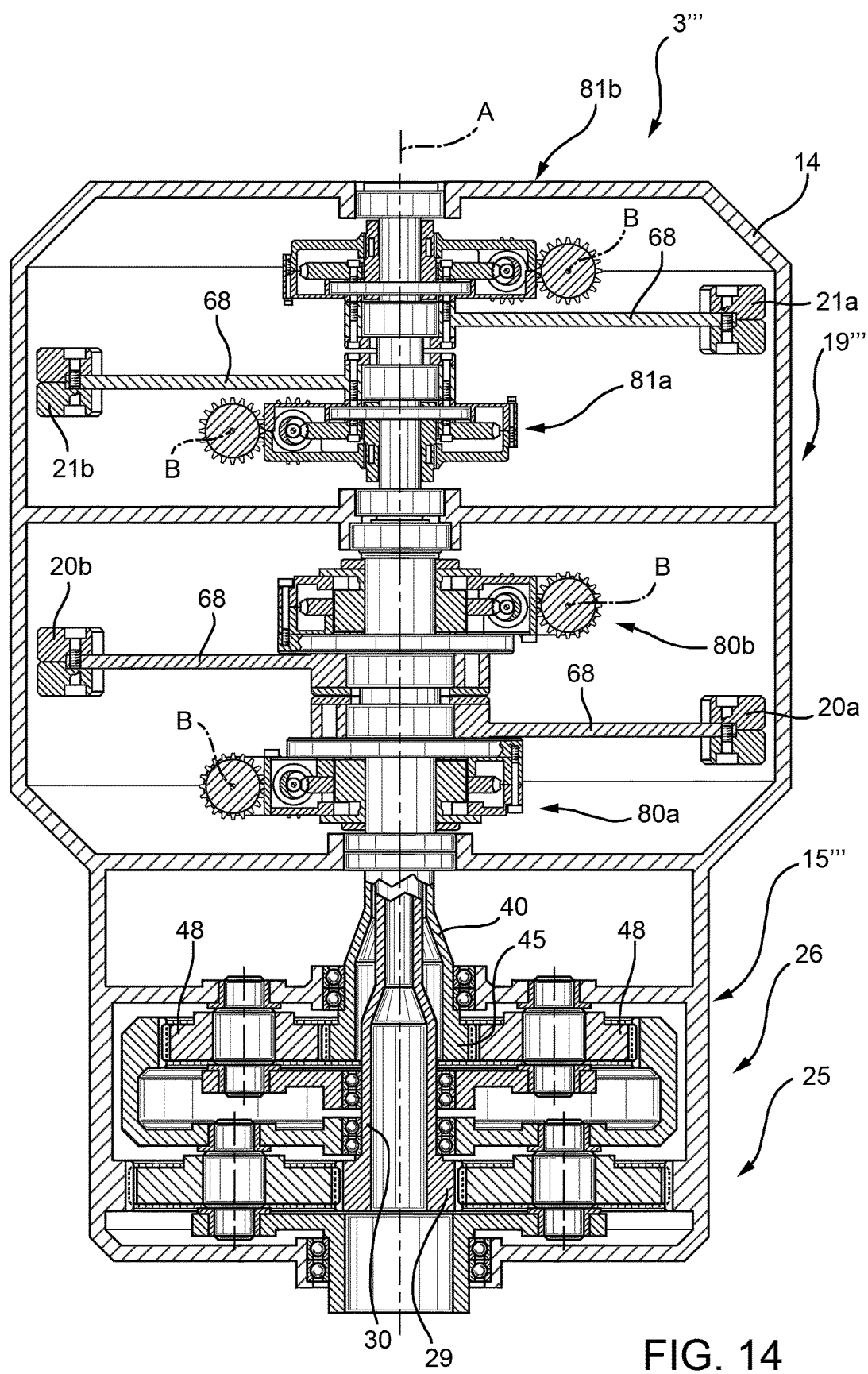
FIG. 14 shows, in cross-section, a rotor according to a fourth embodiment of the present invention, with parts removed for clarity.

Referring to FIG. 14, reference numeral 3''' indicates a rotor according to a fourth embodiment of the present invention.

Rotor 3''' is similar to rotor 3 and will hereinafter be described only with regard to what differentiates it from the latter; the same or equivalent parts of the rotors 3, 3''' will be indicated, where possible, by the same reference numbers.

In particular, rotor 3''' differs from rotor 3 in that the entire transmission unit 19''', i.e. both stages, is housed inside the body 14 of the flow conveyor 10.

The functioning of rotor 3''' is identical to that of rotor 3 and is therefore not described.

From examination of the characteristics of the rotor 3, 3', 3'', 3''' according to the present invention, the advantages that can be achieved therewith are evident.

In particular, the masses 20a, 20b; 21a, 21b are driven in rotation by the mast 6 via the transmission unit 19, 19', 19'', 19'''.

In this way, it is possible to achieve "active" vibration damping of the mast 6 in a plane orthogonal to axis A by exploiting the rotation of the mast 6 and using the electric motors 82, 82'' only for regulating the amplitude and phase of the first and second resultants of the forces generated by the respective masses 20a, 20b; 21a, 21b. It follows that it is possible to achieve the advantages typical of "active" dampers with a significant reduction in costs, bulk and weight.

Due to the fact that the transmission unit 19, 19', 19'', 19''' comprises epicyclic trains functionally interposed between the mast 6 and the masses 20a, 20b; 21a, 21b, it is possible to control the speed of rotation of the masses 20a, 20b; 21a, 21b with high precision and repeatability. In consequence, the damping action of the masses 20a, 20b; 21a, 21b is also particularly precise and repeatable.

The actuators 80a, 80b, 81a, 81b; 80a'', 80b'', 81a'', 81b'' enable controlling the phase and amplitude of the first and the second resultants in a wide range of operating conditions of the blades 9.

The coupling between each worm screw 65 and the gear teeth 67 of the associated disc 66, 66'' is irreversible. In greater detail, the rotation of each worm screw 65 about axis B causes rotation of the associated disc 66, 66''- and, consequently, of the associated shaft 30, 40 and the associated masses 20a, 20b; 21a, 21b—about axis A. Conversely, any rotation of the disc 66 about axis A does not cause rotation of the associated worm screw 65 about axis B. In addition, the disc 66, 66'' is mounted in a manner to rotate about axis A with respect to the mast 6.

Therefore, when the electric motors 82, 82'' are deactivated, the associated worm screws 65 are angularly stationary with respect to axis B and cannot be driven in rotation by the inertia of the discs 66. In this situation, the worm screws 65 and the associated discs 66, 66'' behave like rigidly connected bodies and are driven in rotation by shaft 30 (40) with the respective angular speeds (N−1)*Ω ((N+1)*Ω).

Conversely, when the electric motors 82, 82'' are activated, rotation of the associated worm screws 65 causes rotation of the corresponding discs 66, 66'' and, therefore, of the corresponding masses 20a, 20b; 21a, 21b with respect to the mast 6 and about axis A by the angles necessary for achieving the desired amplitude and phase values for the first and second resultant forces.

The rollers 22' forming the masses 20a, 20b; 21a, 21b of rotor 3' are radially movable with respect to the associated arms 68 and radially slide in guides 23'. In this way, the first and second resultants are discharged on the body 14 of the flow conveyor 10 and transferred from the latter to the mast 6.

The electric motors 82, 82'' of the actuators 80a'', 80b'', 81a'', 81a'' of rotor 3'' are angularly fixed with respect to axis A. In consequence, it is not necessary to provide any slip ring for electrically powering these electric motors 82, 82', with evident simplification of production and maintenance operations for the rotor 3''.

The rotor 3, 3', 3'', 3''' comprises two pairs of actuators 80a, 80b, 81a, 81b; 80a'', 80b'', 81a'', 81a''. In consequence, in the event of failure of one of the electric motors 82 connected to one of the masses 20a, 20b; 21a, 21b, it is possible to preserve the vibration damping function by simply operating the electric motor 82 associated with the other one of masses 20a, 20b; 21a, 21b and opportunely changing its angular position about axis A.

Rotor 3''' has the entire transmission unit 19''' housed inside the body 14 of the flow conveyor 10, leaving the mast 6 free and simplifying assembly.

Finally, it is also clear that modifications and variants can be made regarding the rotor 3, 3', 3'', 3''' described and illustrated herein without departing from the scope defined by the claims.

In particular, the rotor 3, 3', 3'', 3''' could be used in a convertiplane instead of in a helicopter 1.

Furthermore, instead of the masses 20a, 20b; 21a, 21b, the rotor 3, 3', 3', 3''' could comprise just two masses mounted on respective pantographs operable for adjusting the distance between these masses and axis A and, therefore, control the amplitude and phase of the resultant damping force generated on the mast 6.

Finally, instead of the masses 20a, 20b; 21a, 21b, the rotor 3, 3', 3', 3''' could comprise just two masses slidably mounted on respective arms and a pair of guides with a spiral profile in contact with the respective masses. In this solution, the arms are driven in rotation about axis A to adjust the phase of the resultant damping force generated on the mast 6 and the guides are also driven in rotation to adjust the amplitude of this resultant damping force.

Finally, the rotor according to the present invention could be the tail rotor 4 of the helicopter 1 instead of the main rotor 3, 3', 3'', 3'''.

The invention claimed is:

1. A rotor (3, 3', 3''') for a hover-capable aircraft (1), comprising:
   a hub (5) rotatable about a first axis (A) and, in turn, comprising a plurality of blades (9);
   a mast (6) connectable to a drive member of said aircraft (1) and operatively connected to said hub (5) to drive the hub (5) in rotation about said first axis (A);
   damping means (15; 20a, 20b; 21a, 21b) to dampen the transmission of vibrations to said mast (6) in a plane orthogonal to said first axis (A);
   said damping means (15; 20a, 20b; 21a, 21b) in turn comprising at least one first mass (20a, 20b) and at least one second mass (21a, 21b) that can eccentrically rotate about said first axis (A), respectively with a first and a second speed of rotation ((N−1)*Ω; −(N+1)*Ω) with respect to said mast (6);
   said first mass (20a, 20b) and second mass (21a, 21b) being operatively connected to said mast (6) to generate, respectively, a first and a second damping force on said mast (6) having a main component in a direction radial to said first axis (A);
   said rotor (3, 3', 3''') further comprising a transmission unit (19, 19', 19'''), which is functionally interposed between said mast (6) and said first and second masses (20*a*, 20*b*; 21*a*, 21*b*) so as to drive said first and second masses (20*a*, 20*b*; 21*a*, 21*b*) in rotation in opposite directions to each other;

characterized in that said first and second masses (20*a*, 20*b*; 21*a*, 21*b*) generate, in use, a resultant force with a sinusoidal course on said mast (6);

said rotor (3, 3', 3''') further comprising actuator means (80*a*, 80*b*, 81*a*, 81*b*) selectively operable to vary the amplitude and phase of said resultant force;

said actuator means (80*a*, 80*b*, 81*a*, 81*b*) comprising:

a drive member (82);

a support element (66) operatively connected to one of said first and second masses (20*a*, 20*b*; 21*a*, 21*b*) and rotatable with respect to said mast (6); and a further transmission unit (65, 67) that can be driven by said drive member (82) and designed to drive, in use, said support element (66);

said further transmission unit (65, 67) being configured so as to irreversibly transmit motion only from an output member (83) of said drive member (82) to said support element (66) and to prevent the transmission of motion in the opposite direction from said support element (66) to said drive member (82);

said further transmission unit (65, 67) comprising a worm screw (65) that can be operated by said drive member (82), and helical gear teeth (67) carried by said support element (66) and irreversibly meshing with said worm screw (65);

said rotor (3, 3', 3''') comprising, for each said first mass (20*a*, 20*b*) and second mass (21*a*, 21*b*), an associated casing (62, 63);

said associated casing (62, 63) rotating integrally with said mast (6) and with said drive member (82) about said first axis (A), and at least partly housing said further transmission unit (66, 67);

the associated output member (83) rotating with respect to said casing (62, 63) about a second axis (B) transversal to said first axis (A);

said support element (66) being mounted in a manner angularly integral with said casing (62, 63) about said first axis (A).

2. A rotor according to claim 1, characterized in that said transmission unit (19; 19'; 19''') comprises a first output member (30, 68; 98*c*, 98*d*, 68) connected to said first mass (20*a*, 20*b*) and at least a second output member (40, 68; 98*a*, 98*b*, 68) connected to said second mass (21*a*, 21*b*);

said transmission unit (19; 19') being configured so as to drive said first output member (30, 68; 98*c*, 98*d*, 68) in rotation with a third angular speed associated with said first angular speed ((N−1)Ω) and in a first direction, and said second output member (40, 68; 98*a*, 98*b*, 68) with a fourth angular speed associated with said second angular speed (−(N+1)*Ω) and in a second direction opposite to said first direction.

3. A rotor according to claim 2, characterized in that said transmission unit (19, 19', 19''') comprises:

a first stage (25) functionally interposed between said mast (6) and said at least one first mass (20*a*, 20*b*); and a second stage (26) functionally interposed between said first stage (25) and at least one said second mass (21*a*; 21*b*).

4. A rotor according to claim 3, characterized in that said first and second stages (25, 26) comprise a first and a second epicyclic train, respectively;

a first and a second sun gear (29, 45) of said first and second epicyclic trains defined by said first and second stages (25, 26) being angularly integral about said first axis (A) with said first and second masses (20*a*, 20*b*; 21*a*, 21*b*), respectively;

said first sun gear (29) being further angularly integral with a second ring gear (41) of said second epicyclic train defined by said second stage (26);

said first and second epicyclic trains defined by said first and second stages (25, 26) further comprising:

respective first and second planet gears (33, 35; 46, 48);

a common planet-gear carrier (28), about which said first and second planet gears (33, 37; 46, 48) rotate and which is connected to a fuselage (2) of said aircraft (1);

said first planet gears (33, 35, 37) meshing with said first sun gear (29) and with a first ring gear (27);

said second planet gears (46, 48) meshing with said second sun gear (45) and with said second ring gear (41).

5. A rotor according to claim 1, characterized in that said first speed of rotation is equal to (N−1)*Ω and said second speed of rotation is equal to −(N+1)*Ω, where N is the number of said blades (9) and Ω is the speed of rotation of said mast (6) in a reference system integral with said fuselage (2);

said first mass (20*a*, 20*b*) being rotatable in the same direction as said mast (6) and with respect to said mast (6) with said first angular speed ((N−1)*Ω);

said second mass (21*a*, 21*b*) being rotatable in the opposite direction to said mast (6) and with respect to said mast (6) with said second angular speed ((N+1)*Ω).

6. A rotor according to claim 1, characterized in that said actuator means (80*a*, 80*b*, 81*a*, 81*b*) are selectively operable to vary a first angle between said first masses (20*a*, 20*b*) and/or a second angle between said second mass (21*a*, 21*b*) with respect to said first axis (A).

7. A rotor according to claim 1, characterized in that said first and second masses (20*a*, 20*b*; 21*a*, 21*b*) are movable along a direction radial to said first axis (A) with respect to said mast (6), and make contact with respective guides (23') rotating integrally with said mast (6) about said first axis (A).

8. A rotor according to claim 1, characterized in that it comprises a flow conveyor (10) connected to said hub (5) and designed to direct the airflow generated, in use, from the rotation of said blades (9) according to a predetermined path;

said first and second masses (20*a*, 20*b*; 21*a*, 21*b*) being housed inside said flow conveyor (10);

said rotor (3, 3') being characterized in that said first and second epicyclic trains defining said first and second stages (25, 26; 90*a*, 90*b*, 90*c*, 90*d*) are housed inside said mast (6);

or in that the entire said transmission unit (19''') is housed inside said flow conveyor (10).

9. A hover-capable aircraft (1), characterized in that it comprises a rotor (3, 3', 3') according to claim 1.

10. A rotor (3'') for a hover-capable aircraft (1), comprising:

a hub (5) rotatable about a first axis (A) and, in turn, comprising a plurality of blades (9);

a mast (6) connectable to a drive member of said aircraft (1) and operatively connected to said hub (5) to drive the hub (5) in rotation about said first axis (A);

damping means (15; 20*a*, 20*b*; 21*a*, 21*b*) to dampen the transmission of vibrations to said mast (6) in a plane orthogonal to said first axis (A);

said damping means (15; 20a, 20b; 21a, 21b) in turn comprising at least one first mass (20a, 20b) and at least one second mass (21a, 21b) that can eccentrically rotate about said first axis (A), respectively with a first and a second speed of rotation ((N−1)*Ω; −(N+1)*Ω) with respect to said mast (6);

said first mass (20a, 20b) and second mass (21a, 21b) being operatively connected to said mast (6) to generate, respectively, a first and a second damping force on said mast (6) having a main component in a direction radial to said first axis (A);

said rotor (3") further comprising a transmission unit (19"), which is functionally interposed between said mast (6) and said first and second masses (20a, 20b; 21a, 21b) so as to drive said first and second masses (20a, 20b; 21a, 21b) in rotation in opposite directions to each other;

said transmission unit (19") comprising:

a casing (120) fixed with respect to said fuselage (2);

a first stage (90a, 90b) functionally interposed between said mast (6) and said second mass (21a, 21b); and a second stage (90c, 90d) functionally interposed between said mast (6) and said first mass (20a, 20b);

said first stage (90a, 90b) and second stage (91a, 91b) comprising a first and a second epicyclic train, respectively;

said first and second epicyclic trains having a third and a fourth sun gear (97a, 97b; 97c, 97d), respectively, operatively connected to the respective said second and first masses (21a, 21b; 20a, 20b) and defining a first and a second motion output, respectively;

said first epicyclic train further comprising:

a third ring gear (96a; 96b) defining a first motion input and rotating integrally with said mast (6);

a plurality of third planet gears (99a, 99b) meshing with said third ring gear (96a, 96b) and said third sun gear (97a, 97b); and a third planet-gear carrier (103a, 103b) with respect to which said third planet gears (99a, 99b) are mounted in a rotatable manner;

said second epicyclic train further comprising:

a fourth ring gear (96c, 96d);

a plurality of fourth planet gears (99c, 99d) meshing with said fourth ring gear (96c; 96d) and said fourth sun gear (97c, 97d); and a fourth planet-gear carrier (103c) defining a second motion input and rotating integrally with said mast (6) and with respect to which said fourth planet gears (99c, 99d) are mounted in a rotatable manner;

said third planet-gear carrier (103a, 103b) and said fourth ring gear (96c; 96d) making sliding contact with said casing (120);

characterized in that said first and second masses (20a, 20b; 21a, 21b) generate, in use, a resultant force with a sinusoidal course on said mast (6);

said rotor (3") further comprising actuator means (80a, 80b, 81a, 81b) selectively operable to vary the amplitude and phase of said resultant force;

said actuator means (80a, 80b, 81a, 81b) comprising:

a drive member (82");

a support element (66") operatively connected to one of said first and second masses (20a, 20b; 21a, 21b) and rotatable with respect to said mast (6); and a further transmission unit (65, 67) that can be driven by said drive member (82") and designed to drive, in use, said support element (66");

said further transmission unit (65, 67) being configured so as to irreversibly transmit motion only from an output member (83) of said drive member (82") to said support element (66") and to prevent the transmission of motion in the opposite direction from said support element (66") to said drive member (82");

said further transmission unit (65, 67) comprising a worm screw (65) that can be operated by said drive member (82"), and helical gear teeth (67) carried by said support element (66") and irreversibly meshing with said worm screw (65);

said rotor (3") further comprising:

a first said drive member (82") designed to cause rotation, according to a predetermined angle, of said second mass (21a, 21b) about said first axis (A), and a first said support element (66") operatively connected to said first said drive member (82") by a first said further transmission unit (66", 67); said first support element (66") being carried by said third planet-gear carrier (103a, 103b); the operation of said first drive member (82") causing relative motion of said third planet-gear carrier (103a, 103b) with respect to said casing (120) and about said first axis (A); and/or a second said drive member (82") designed to cause rotation, according to a predetermined angle, of said first mass (20a, 20b) about said first axis (A) and a second said support element (66") operatively connected to said second said drive member (82") by a second said further transmission unit (66", 67); said second support element (66") being carried by said fourth ring gear (96c, 96d); the operation of said second drive member (82") causing, in use, relative motion of said fourth ring gear (96c, 96d) with respect to said casing (120) and about said first axis (A).

11. A rotor according to claim 10, characterized in that said transmission unit (19") comprises a first output member (30, 68; 98c, 98d, 68) connected to said first mass (20a, 20b) and at least a second output member (40, 68; 98a, 98b, 68) connected to said second mass (21a, 21b);

said transmission unit (19") being configured so as to drive said first output member (30, 68; 98c, 98d, 68) in rotation with a third angular speed associated with said first angular speed ((N−1)*Ω) and in a first direction, and said second output member (40, 68; 98a, 98b, 68) with a fourth angular speed associated with said second angular speed (−(N+1)*Ω) and in a second direction opposite to said first direction.

12. A rotor according to claim 10, characterized in that said first speed of rotation is equal to (N−1)*Ω and said second speed of rotation is equal to −(N+1)*Ω, where N is the number of said blades (9) and SI is the speed of rotation of said mast (6) in a reference system integral with said fuselage (2);

said first mass (20a, 20b) being rotatable in the same direction as said mast (6) and with respect to said mast (6) with said first angular speed ((N−1)*Ω);

said second mass (21a, 21b) being rotatable in the opposite direction to said mast (6) and with respect to said mast (6) with said second angular speed ((N+1)*Ω).

13. A rotor according to claim 10, characterized in that said actuator means (80a", 80b", 81a", 81b") are selectively operable to vary a first angle between said first masses (20a, 20b) and/or a second angle between said second mass (21a, 21b) with respect to said first axis (A).

14. A rotor according to claim 10, characterized in that it comprises a flow conveyor (10) connected to said hub (5) and designed to direct the airflow generated, in use, from the rotation of said blades (9) according to a predetermined path;

said first and second masses (20*a*, 20*b*; 21*a*, 21*b*) being housed inside said flow conveyor (10);

said rotor (3") being characterized in that said first and second epicyclic trains defining said first and second stages (25, 26; 90*a*, 90*b*, 90*c*, 90*d*) are housed inside said mast (6).

15. A hover-capable aircraft (1), characterized in that it comprises a rotor (3") according to claim 10.

\* \* \* \* \*